(12) United States Patent
Lawrence

(10) Patent No.: US 7,985,362 B2
(45) Date of Patent: Jul. 26, 2011

(54) METHOD OF FORMING A HOUSING

(75) Inventor: Rodney John Lawrence, Tauranga (NZ)

(73) Assignee: Gallagher Group Limited, Hamilton (NZ)

( * ) Notice: Subject to any disclaimer, the term of this patent is extended or adjusted under 35 U.S.C. 154(b) by 21 days.

(21) Appl. No.: 12/064,596

(22) PCT Filed: Aug. 23, 2006

(86) PCT No.: PCT/NZ2006/000214
§ 371 (c)(1),
(2), (4) Date: Oct. 29, 2008

(87) PCT Pub. No.: WO2007/024146
PCT Pub. Date: Mar. 1, 2007

(65) Prior Publication Data
US 2009/0057946 A1  Mar. 5, 2009

(30) Foreign Application Priority Data
Aug. 23, 2005 (NZ) ........................... 541983

(51) Int. Cl.
*B29C 45/14* (2006.01)

(52) U.S. Cl. .................. 264/250; 264/255; 264/272.15; 264/267; 264/310; 264/311; 264/45.1; 264/46.6; 264/275

(58) Field of Classification Search .......................... None
See application file for complete search history.

(56) References Cited

U.S. PATENT DOCUMENTS

| | | | | |
|---|---|---|---|---|
| 3,505,137 | A * | 4/1970 | Kliene | 156/78 |
| 3,875,275 | A * | 4/1975 | Lemelson | 264/45.3 |
| 4,042,663 | A * | 8/1977 | Harder, Jr. | 264/45.7 |
| 4,485,057 | A * | 11/1984 | Kristensson et al. | 264/45.7 |
| 6,682,674 | B2 | 1/2004 | Sandevi et al. | |
| 7,261,539 | B2 * | 8/2007 | Pitscheneder et al. | 425/143 |
| 7,607,249 | B2 * | 10/2009 | Singleton | 40/633 |
| 2005/0129921 | A1 | 6/2005 | Laws et al. | |
| 2006/0003137 | A1 * | 1/2006 | Amstutz et al. | 428/68 |

FOREIGN PATENT DOCUMENTS

| | | |
|---|---|---|
| GB | 1530121 | 10/1974 |
| GB | 2089274 | 6/1982 |
| GB | 2179290 | 3/1987 |
| GB | 2180191 | 3/1987 |
| GB | 2398454 | 8/2004 |
| WO | WO 93/24381 | * 12/1993 |

* cited by examiner

*Primary Examiner* — Edmund H. Lee
(74) *Attorney, Agent, or Firm* — Knobbe Martens Olson & Bear LLP

(57) ABSTRACT

The present invention encompasses a method of forming a housing that locates an internal element. This method is instigated by firstly the steps of locating an internal element within a mould, and then introducing a plastic material into the mould. Next the mould is rotated to form a plastic exterior surface of a housing on the internal surface of the mould with said internal element being located inside the exterior surface of the housing formed.

11 Claims, 2 Drawing Sheets

METHOD OF FORMING A HOUSING

TECHNICAL FIELD

This invention relates to a method of manufacturing a housing for an internal element.

Preferably the present invention may be used in manufacturing a housing to contain an antenna for use in an identification system. However, those skilled in the art should appreciate that the present invention can be used to manufacture housings which contain other internal elements, and reference to its use to provide housing for an antenna throughout this specification should in no way be seen as limiting.

BACKGROUND ART

Radio Frequency Identification (RFID) systems are used for many varied applications. RFID tags can be used as security devices for prevention of theft of articles, for personnel identification, for building security applications, and for animal tagging. An RFID tag can be used to identify any physical article, be it product, animal, or person, in these applications. Interacting with the RFID tag is an RFID reader which includes an antenna to read tags, thus identifying the object.

When using an RFID antenna outdoors, for animal management purposes or for identifying products or people, the antenna is subject to external forces which may degrade or break the antenna. The antenna may also oxidise due to the weather causing water to seep into the antenna housing, or other caustic substances affecting the antenna's performance.

The geometry of the antenna used to read RFID tags is important, as the shape of the antenna defines the area in which it can read tags. The antenna usually is formed in a closed curve, which maximises the spatial volume in which a tag can be read. The housing that the antenna is in must hold the antenna in this shape, as well as protecting the antenna from outside forces.

Current housings for antennas used in RFID systems are usually made from a plastic material housing, which is injection moulded in two or more parts. These parts are joined together at a seam interface which offers a way for water to enter and potentially oxidise the antenna.

Injection moulding also has a high tooling cost, and generally forms only solid parts. Other techniques such as thermoforming and spray coating can be used, but these methods also result in a housing which is moulded in two or more parts.

Rotational moulding, in which plastic particulate material is rotated and heated to create hollow parts, is another alternative for creating plastic components. This process is usually used to create medium to large hollow items. However, this method makes no allowance for an antenna to be placed inside the finished article without an entry hole being created after the moulding step. This hole, when stopped, would again suffer from problems with the join creating a weak point in the housing.

It would be preferable to have a one piece housing for an antenna which is solid, resistant to external forces or impacts, and also resistant to water or other corrosive substances.

It would also be preferable to have a method of manufacturing a housing which fits these requirements, and is also fast and relatively simple to execute. Furthermore, it would be preferable to have a method of rotationally moulding a single integral housing which encloses and locates an internal element.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

It is an object of the present invention to address the foregoing problems or at least to provide the public with a useful choice.

Further aspects and advantages of the present invention will become apparent from the ensuing description which is given by way of example only.

DISCLOSURE OF INVENTION

According to one aspect of the present invention there is provided a method of forming a housing that locates an internal element characterised by the steps of:
  i) locating an internal element within a mould, and
  ii) introducing a plastic material into the mould, and
  iii) rotating the mould to form a plastic exterior surface of a housing on the internal surface of the mould with said internal element being located inside the exterior surface of the housing formed.

According to another aspect of the present invention there is provided a method of forming a housing as substantially as described above which includes the further subsequent steps of:
  iv) injecting a packing material into the interior of the housing formed through at least one injection aperture.

Preferably the housing formed may encase and enclose an internal element to protect it, from external forces, and from corrosive compounds present in the environment in which the element is to be used.

Preferably an internal element may be a physical element which is delicate and requires a solid housing which will protect it from external forces. In a further preferred embodiment, this internal element may be an antenna for an RFID system. The antenna preferably may be fixed inside the housing at a set location with a fixed geometry, so that external forces such as dropping or shaking of the housing would not deform the antenna.

However, in alternative embodiments the internal element may be any other kind of element which needs to be fixed in a location and protected from external forces or corrosive compounds. This may be an antenna, a transmitting type device, a handheld RFID tag reader or any other element such as a receiver that needs to be placed in a fixed position and protected.

Reference throughout this specification will be made to the present invention including an internal element being an antenna used within an RFID reader. However, those skilled in the art should recognise that the present invention may also be used to form housings for other internal elements, and reference throughout the specification to the internal element being an antenna should in no way be seen as limiting.

Preferably the housing may be moulded while the internal element is inside the housing as it is formed.

Preferably an antenna may be located within a mould which will shape the housing. This antenna may be located by fixing it at a set position within the mould. The antenna should be fixed so that it can resist external forces introduced during the moulding of the housing, and to prevent the antenna being deformed during this process. Fixing the antenna allows the housing to be formed with the internal element secured safely inside.

Preferably a mould is used to define an external surface of the housing. An interior surface of the mould may provide a shape for the housing which is to be formed. This mould may form any hollow shape, which allows an internal element to be fixed within it.

Preferably a plastic material is introduced into the mould once the antenna is located within same. A plastic material may be any material with a plastic nature that is capable of being moulded and cast into various shapes or forms. In a preferred embodiment a plastic material may be one of the many polymer or hydrocarbon compounds generally referred to as a plastic.

Reference throughout the specification will be made to the plastic material being formed by one of the compounds generally known as plastic. However, those skilled in the art should realise that plastic material can refer to any material which is capable of being moulded and formed into a housing as required for the present invention.

Preferably after the step of introducing a plastic material into the mould, there may be a subsequent step of heating this plastic. Heating of the plastic may melt or cause the plastic to change into a more malleable form. Once the plastic is heated it can easily be moulded into the housing required. Heating may take place before the step of rotating the mould. However, in a preferred embodiment heating may take place concurrently to the mould being rotated.

In a preferred embodiment, once plastic is introduced into the mould, the mould may be rotated. In such instances the mould may be rotated to form a plastic exterior surface of the housing on the internal surface of the mould. As the mould is rotated and heated, the plastic melts and progressively adheres to the interior surface of the mould. This creates a layer of plastic on this surface, and around the interior element which is located inside the mould. This layer will form the exterior surface of the housing once the mould is removed.

In a further preferred embodiment, the plastic introduced may be in particulate or powder form. This allows the plastic to melt easily and provides a smooth finish to the housing formed.

This rotation process is referred to as rotational moulding, and is executed by a standard rotational moulding apparatus. However, those skilled in the art should realise that this step of rotating the mould can be implemented by other apparatuses and reference throughout the specification to it being formed by a rotational moulding apparatus only should in no way be seen as limiting.

Preferably the internal element may be located within the mould by at least one location means. Preferably the location means may be formed by at least one removable pin which hold the internal element within the mould and allow the rotational moulding step to be executed without the internal element moving from a fixed position. Preferably pins locate the antenna with a fixed geometry, so that the antenna is not deformed during the rotational moulding step. These pins are preferably attached to the antenna by way of at least one cable tie firmly attached to the antenna windings.

However, in alternative embodiments the location means may be formed by a fixed pin or other means which allow the internal element to be located within the mould and not move during the rotational moulding process.

Reference throughout the specification will be made to a locating means being formed by a removable pin secured to the internal surface of the mould. However, those skilled in the art should appreciate other ways of locating the internal element are available and reference throughout the specification to removable locating means only should in no way be seen as limiting.

The present invention allows a housing to be formed around an internal element quickly and at a low cost through a rotational moulding process. This housing may be provided with a unitary form and therefore is stronger than the current housings for internal elements, as there are no joins required.

Preferably after the rotational moulding process, the interior of the mould (including removable pins and ties) is covered by the plastic material. This plastic material may form small mounds from the antenna to the interior of the mould as the plastic material is forced outwards and sticks to the pins. After the moulding phase is completed these locating pins can subsequently be removed, leaving an aperture between the outside of the housing and the interior in the centre of each mound at each site previously occupied by a locating pin. The hollow core mounds remaining still support the antenna throughout the housing.

In some embodiments the pin apertures on the exterior of the housing may be heated and sealed, leaving a waterproof housing which supports an antenna in a fixed location.

However, in a preferred embodiment, one or more of these pin apertures may not be sealed to allow access to the interior of the housing. In a preferred embodiment at least one of these remaining apertures may form an exhaust aperture.

Reference throughout the specification will be made to the location means pins being removed and at least one exhaust aperture being retained, while all the other apertures, created when the location pins are removed, are sealed closed. However, those skilled in the art should realise that in other embodiments that the locating pins may not be removed, and reference to the above only throughout the specification should in no way be seen as limiting.

Preferably an injection aperture may also be formed during the rotational moulding step. This injection aperture may be formed within the housing. This may allow the injection aperture to be of a larger size than an exhaust aperture, thus allowing an injection apparatus with a large diameter to be used.

However, in alternative embodiments, the injection aperture may not be formed during the rotational moulding step, and an aperture for injecting may be created later, or an exhaust aperture may be used as an injection aperture.

Preferably there may be provided one injection aperture, however in alternative embodiments, a number of injection apertures may be used.

Reference throughout the specification will be made to a single injection aperture being formed during the rotational moulding step that is separate to the exhaust aperture(s). However, those skilled in the art should realise that other ways of forming a single, or multiple, injection apertures can be used, and reference to the above only throughout this specification should in no way be seen as limiting.

Preferably an injection aperture may be used to inject packing material into the interior of the housing formed. This packing material may be injected under pressure to fill the internal cavity of the housing.

Preferably, after the moulding stage has terminated, there may be two apertures in the housing, being an injection aperture, provided to inject a packing material into the housing, and an exhaust aperture, provided as a vent to release air from the housing.

Preferably, after packing material has been injected, the exhaust apertures may be sealed by melting the plastic mound, which may form from the antenna to the interior of the mould, thus sealing the aperture and, making the housing both solid and water tight.

Preferably a packing material may be provided by a fluid used to fill the interior of the housing. In a further preferred embodiment this packing material may be a foam cellular structure which sets to form a dense and solid cushion around the antenna inside the mould.

However, in alternative embodiments packing material may be any other material which can be injected through an injection aperture and provides protection from external forces to the antenna. This may be any kind of material such as particulate material, foam, or any other fluid which is used to fill the interior volume of the housing. The injection of the foam is preferably applied when the housing formed by the rotational moulding step is still warm. However, the foam may also be applied at a later stage.

Preferably when the packing material is injected to the interior of the housing, the housing may be located within a blocking form. This blocking form may be a mould similar to the mould used to create the housing, but may be formed by a rigid material such as wood. This blocking form will stop the housing being deformed when the packing material is injected under pressure. The foam may expand once injected to a solid form, and this blocking form will ensure this expansion does not deform the housing.

Preferably after the packing material is injected, the injection and exhaust apertures may be sealed closed. Sealing closed an aperture preferably involves heating the plastic material so that the plastic melts to form a consistent exterior surface of the housing. However, in alternative embodiments this step may consist of filling in the apertures or any other way that seals an aperture closed. Once the aperture(s) are closed, the housing is preferably now formed with one continuous surface of plastic on the outside, with foam in the inside locating an antenna which now is immobilised. At least one aperture, such as the injection aperture may also be left unsealed, as the housing is now sealed against water by the waterproof foam.

The present invention may provide many potential advantages over the prior art.

The present invention may allow a quick, simple, and cost effective way of forming a housing which locates an interior element or antenna in a fixed position. This method allows an antenna to be protected from outside external forces as well as corrosive environmental substances such as water. The resultant housing and antenna form can provide a unitary plastic outside housing with a packing material inside which stops the internal element from moving, breaking or deforming when external forces are applied.

The present invention provides a simple and cost effective way of providing a solid, protective housing for an antenna which protects it from any negative consequences.

BRIEF DESCRIPTION OF DRAWINGS

Further aspects of the present invention will become apparent from the following description which is given by way of example only and with reference to the accompanying drawings in which.

BEST MODES FOR CARRYING OUT THE INVENTION

Figure 1:
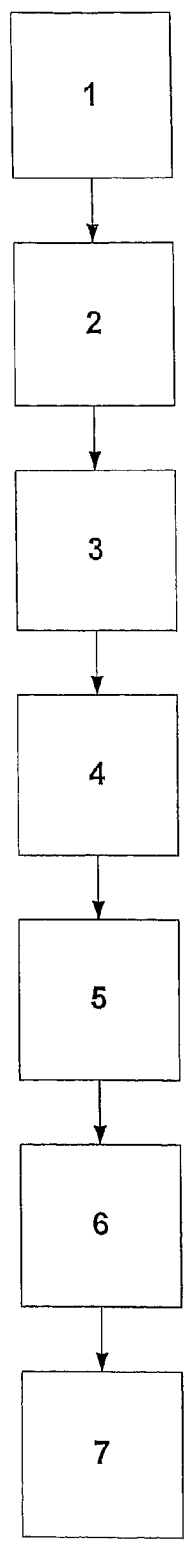
FIG. 1 shows a flowchart of the steps executed in accordance with a preferred embodiment of the present invention.

FIG. 1 illustrates the steps executed by the present invention and one preferred embodiment.

Step 1: An internal element is located within the bottom half of a mould for a housing by a set of locating pins. In this embodiment, the internal element is an antenna, which is tied in a specific geometry with cable ties and fixed to the locating pins. The centre cable ties are clamped firmly onto the antenna windings. Cable ties in the corners are allowed to slide on the antenna wires, as not to deform the antenna during heating and cooling processes associated with manufacturing the panel.

Step 2: Plastic granules or powder are placed inside the mould and the top half of the mould is secured in place.

Step 3: The mould is heated and rotated so that the plastic granules or powder melt and are forced outwards to form a surface on the interior of the mould and around the internal element. The plastic also forms mounds, which gather around the pins. These mounds and leg supports extend from the antenna to the interior of the mould and connect into the cable tie.

Step 4: Once the plastic is slightly solidified but still soft, the locating pins are removed.

Step 5: When set, the plastic housing removed from the original mould is placed inside a further blocking form, and all but one of the apertures formed when the locating pins are removed are sealed.

Step 6: A foam material is injected through the injection aperture formed as part of the housing. Further apertures act as an exhaust, releasing the air from inside the housing.

Step 7: When the mould is full of foam and the foam has set, the exhaust apertures are sealed, and the housing is complete.

Figure 2:
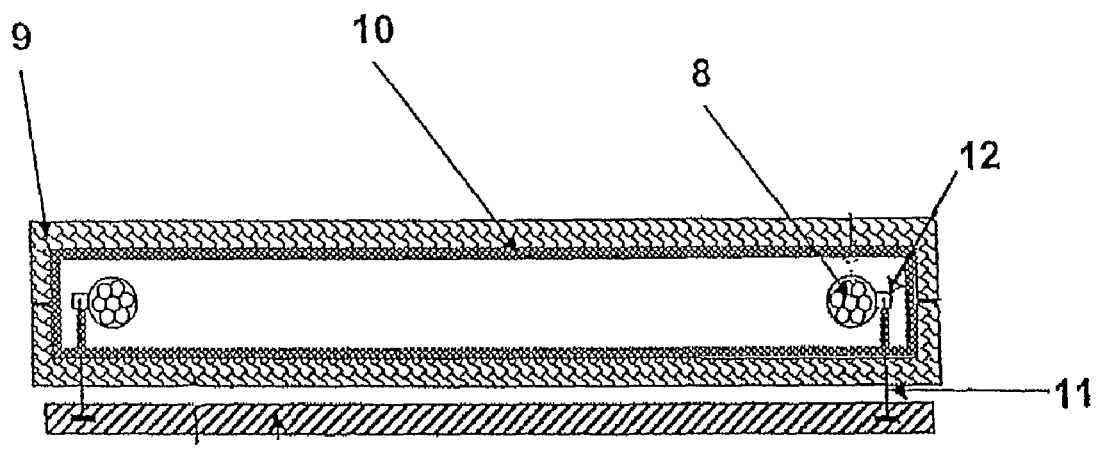
FIG. 2 shows a cross sectional view of a resulting housing after the moulding process discussed with respect to FIG. 1.

FIG. 2 shows a cross sectional view of the housing mould after the rotational moulding step.

This view shows an internal element formed by an antenna (8), a mould (9), and plastic material (10) which is forming a housing on the interior surface of the mould. It also shows location means, formed by locating pin (11), fixed to the internal element via a cable tie (12).

The plastic material (10) has been spread along the interior of the mould (9) by the force of the rotational moulding. Plastic has also collected along the location pin (11). When the pin (11) is removed, this leaves an aperture (not shown) which allows a packing material to be injected into the interior of the housing formed.

The present invention provides an improved way of making a housing for an internal element such as an antenna which is quick and cost effect. The method also creates a housing which is solid, unified and protects the internal antenna from damage much better than any previous housing.

Aspects of the present invention have been described by way of example only and it should be appreciated that modifications and additions may be made thereto without departing from the scope thereof as defined in the appended claims.

I claim:

1. A method of forming a housing to locate an antenna, comprising:
   using at least one locating pin to locate an antenna at a predetermined set location and fixed geometry within a mould, and
   introducing a plastic material into the mould, and
   rotating and heating the mould to form a plastic coating on the internal surface of the mould, on the at least one locating pin and on at least a portion of the antenna in the vicinity of the at least one locating pin, wherein the plastic coating on the internal surface of the mould forms an exterior surface of the housing and wherein the antenna is located inside the exterior surface of the housing and at a distance from the internal surface of the mould greater than a thickness of the exterior surface of the housing, and
   injecting a packing material into the housing to fill the interior of the housing formed.

2. A method of forming a housing as claimed in claim 1 wherein the plastic introduced is in particulate form.

3. A method of forming a housing as claimed in claim 1 wherein at least one locating pin is removed after the mould is rotated to form at least one aperture within the exterior surface of the housing.

4. A method of forming a housing as claimed in claim 3 wherein the at least one aperture fauns at least in part an exhaust aperture.

5. A method of forming a housing as claimed in claim 3 wherein the at least one aperture forms at least in part an injection aperture.

6. A method of forming a housing as claimed in claim 1 wherein an injection aperture is formed during the rotational moulding step.

7. A method of forming a housing as claimed in claim 6 wherein the packing material is injected through the injection aperture.

8. A method of forming a housing as claimed in claim 1 wherein the packing material forms a foam cellular structure.

9. A method of forming a housing as claimed in claim 1 wherein the housing is located within a blocking form when the packing material is injected to the interior of the housing.

10. A method of forming a housing as claimed in claim 9 wherein the blocking form is a rigid mould.

11. A method of forming a housing as claimed in claim 3 wherein the packing material is injected through the at least one aperture.

* * * * *

UNITED STATES PATENT AND TRADEMARK OFFICE
CERTIFICATE OF CORRECTION

| | | |
|---|---|---|
| PATENT NO. | : 7,985,362 B2 | Page 1 of 1 |
| APPLICATION NO. | : 12/064596 | |
| DATED | : July 26, 2011 | |
| INVENTOR(S) | : Rodney John Lawrence | |

It is certified that error appears in the above-identified patent and that said Letters Patent is hereby corrected as shown below:

(Claims), Column 8, Line 2, In claim 4 please delete "fauns" and insert -- forms --.

Signed and Sealed this
Third Day of April, 2012

David J. Kappos
*Director of the United States Patent and Trademark Office*